Patented Feb. 23, 1932

1,846,152

UNITED STATES PATENT OFFICE

SAMUEL B. SHELDON, OF DULUTH, MINNESOTA; FIRST AND AMERICAN NATIONAL BANK OF DULUTH, EXECUTOR OF SAID SAMUEL B. SHELDON, DECEASED

MANUFACTURE OF MANGANESE PIG IRON

No Drawing.    Application filed July 17, 1928.    Serial No. 293,488.

This invention relates to a new and improved method of producing pig iron, and more particularly to the production of pig iron with a comparatively high manganese content.

It is well known in the art that basic open hearth slag in general carries an appreciable amount of manganese. It is highly desirable to recover this manganese as the cost of manganese to be added to steel for the production of manganese steel is an important factor in the cost of producing such steel. There are available siliceous ores low in iron content which cannot be economically smelted in many parts of the country, particularly in the northern part of the country.

It is an object of the present invention to provide a method of manufacturing pig iron high in manganese.

It is a further object to provide a method whereby manganese may be recovered from basic open hearth slag.

It is an additional object to provide a method whereby siliceous ores low in iron content may be utilized in the production of manganese pig iron.

It is a further object to provide methods of this character adapted for commercial use in the production of iron.

Other and further objects will appear as the description proceeds.

According to my invention, a blast furnace for the smelting of iron ore will be charged with a mixture of a siliceous ore and a basic open hearth slag, the latter containing manganese. These two constituents will preferably be so proportioned as to give a pig iron having a content of approximately 8% of manganese. The siliceous ore to be used may be one of such a low iron content as not to be capable of economical smelting by usual processes.

This pig iron, with its relatively high content of manganese, will then be charged into another blast furnace, together with iron ore in such proportions as to give a pig iron having a manganese content which is preferably approximately two per cent.

This latter iron is then suitable for making steel and will give a residual manganese in the steel in excess of the .15 per cent ordinarily obtained with average northern iron, thereby materially decreasing the quantity of ferro-manganese necessary to add to give the proper manganese in the steel. It is well known in the art that residual manganese in an open hearth bath functions in the same manner as manganese introduced extraneously.

While I have described one preferred method of carrying out my invention and certain preferable proportions, the method and proportions may be varied to suit different conditions, and I contemplate such changes and modifications as come within the spirit and scope of the appended claims.

I claim:

1. The method of manufacturing manganese pig iron which comprises producing pig iron in a blast furnace from a mixture of manganese-containing basic open hearth slag with iron ore of high silicon content, and charging such pig iron together with iron ore in a second blast furnace, and producing pig iron from said second furnace.

2. The method of manufacturing manganese pig iron which comprises producing pig iron in a blast furnace from a mixture of manganese-containing basic open hearth slag with iron ore of high silicon content, said mixture being so proportioned as to give a pig iron containing approximately 8% of manganese, and charging such pig iron in a second blast furnace, together with iron ore in such proportion as to give a resultant pig iron containing approximately 2% of manganese.

Signed at Duluth, Minnesota, this 10th day of July, 1928.

SAMUEL B. SHELDON.